United States Patent [19]

Ohno et al.

[11] 4,414,556
[45] Nov. 8, 1983

[54] LASER BEAM PRINTER

[75] Inventors: Mitsuo Ohno, Hadano; Kikuo Hatazawa, Atsugi, both of Japan

[73] Assignee: Hitachi, Ltd., Tokyo, Japan

[21] Appl. No.: 303,135

[22] Filed: Sep. 17, 1981

[30] Foreign Application Priority Data

Sep. 18, 1980 [JP] Japan .............................. 55-128548

[51] Int. Cl.³ .......................................... G01D 15/14
[52] U.S. Cl. .................................................. 346/160
[58] Field of Search ................. 346/76 L, 108, 160; 354/5; 355/8, 3 R; 358/300, 302; 178/30

[56] References Cited

U.S. PATENT DOCUMENTS 4,125,829 11/1978 Kayashima ...................... 178/30 X 4,255,040 3/1981 Weigl et al. ....................... 355/3 R

*Primary Examiner*—Thomas H. Tarcza
*Attorney, Agent, or Firm*—Antonelli, Terry & Wands

[57] ABSTRACT

A laser beam printer using a film, in which a fixed form of format information such as a ruled line is printed off, and having a format overlay function is disclosed in which a photosensitive drum is line-scanned by a laser beam having been modulated in accordance with print information and having passed through the film, the film is moved in synchronism with the rotation of the photosensitive drum, and thus a latent image is formed on the photosensitive drum in a manner that the format information in the film is superposed on the print information for modulating the laser beam.

3 Claims, 7 Drawing Figures

LASER BEAM PRINTER

BACKGROUND OF THE INVENTION

1. Field of the Invention

The present invention relates to a printer connected to a computer. A laser beam printer is usually connected to the computer, since the laser beam printer is a high-speed printer and is suited to deal with print information outputted from the computer. The present invention relates specifically to a laser beam printer which can print both of format information and print information in an overlaying condition.

2. Description of the Prior Art

In a laser beam printer, a photosensitive drum is line-scanned by a laser beam modulated according to print information, and a latent image formed on the photosensitive drum is developed to print a desired pattern. Information to be printed includes a fixed form of background information (namely, a format) such as seen in a slip, table, or the like and variable information. If the background information and variable information are processed in the same manner by a processor, the amount of processing to be performed is large and moreover the processing is complicated. Accordingly, the format is processed separately from the variable information.

U.S. Pat. No. 4,125,829 discloses a method of processing a format and variable information in different manners, in which a plurality of formats are stored in a memory in the form of digital data, a selected one of the formats is read out of the memory to be combined with variable print information, and the combined information thus formed is used in modulating a laser beam.

Another method is known which is shown in FIG. 1. A laser beam from a laser 1 is modulated by a modulator 2 in accordance with print information, and then deflected by a scanner 3 so as to scan the surface of a photosensitive drum 4. On the other hand, a format is printed off in a film 5, which is moved by a film driving device 6 in accordance with the rotating speed of the photosensitive drum. The image on the film 5 is projected on the photosensitive drum 4 by means of a lamp 10.

The scanning operation of the laser beam is delayed by a time required to move that part of the photosensitive drum 4, on which the image on the film 5 is projected, to the scanning position, in order that respective latent images of the format and variable print information overlap each other. Thereafter, the latent images are developed by a processor 8 to form an image on the photosensitive drum 4, and the image thus formed is transferred to printing paper 9.

In the former method, however, a great deal of effort is required to prepare digital data for expressing a format, a large amount of processing has to be carried out to read out the format, and moreover a memory for storing the format is required. For these reasons, a printer for carrying out this method becomes high in cost.

In the latter method, the above-mentioned shortcomings are eliminated, but the lamp 10 different from the laser 1 is needed, in addition of the film 5 and film driving device 6.

Both of these methods are disadvantageous in that an inexpensive printer cannot be obtained.

SUMMARY OF THE INVENTION

A main object of the present invention is to provide a laser beam printer which can print a format at a low cost.

A laser beam printer of the present invention has features such that format information is previously recorded on a film, and a laser beam modulated according to print information is directed to a photosensitive drum through the film to scan the drum by the laser beam, whereby a latent image containing overlaid format information and print information is formed on the drum.

DESCRIPTION OF THE PREFERRED EMBODIMENT

Figure 2:
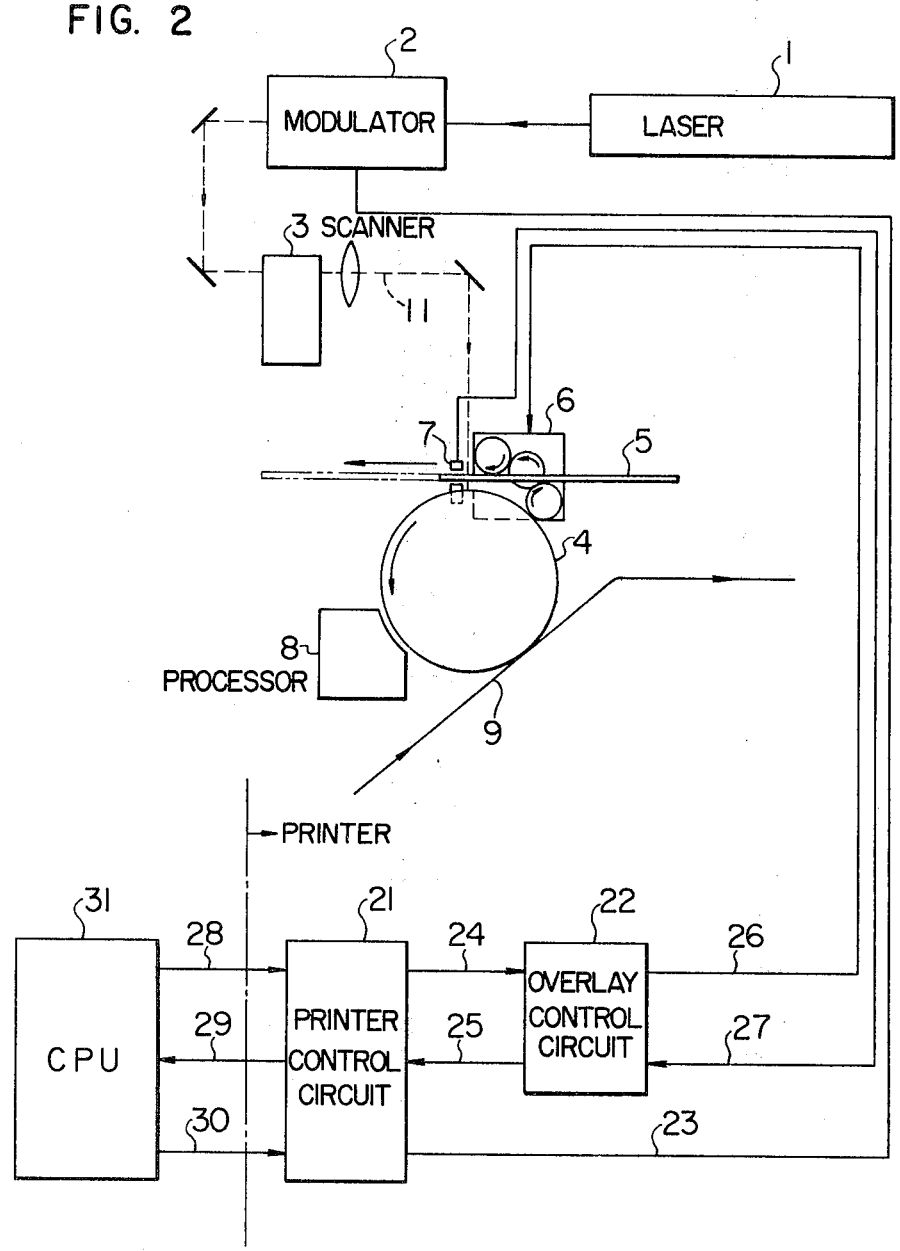
FIG. 2 is a schematic diagram showing an arrangement of a laser beam printer according to the present invention.

FIG. 2 is a schematic diagram showing an embodiment of a laser beam printer according to the present invention. Variable information can be processed in the same manner as disclosed in the previously-mentioned U.S. Pat. No. 4,125,829, and therefore the explanation of the processing of variable information is omitted. A so-called positive developing method is employed in the present invention. In the positive developing system, if, for example, a toner is charged with negative electricity, the surface of a photosensitive drum is charged with positive electricity. Area on the photosensitive drum other than area to be printed is irradiated with light to allow the area to discharge, and thus an electrostatic latent image having the positive polarity is formed on the photosensitive drum. When the toner is put in contact with the photosensitive drum in this state, the toner adheres to only the positively charged areas on the drum, and is then transferred from the drum to printing paper.

Referring now to FIG. 2, a laser beam from a laser 1 is modulated by a modulator 2 on the basis of picture data 23. The modulation is carried out so that those areas on a photosensitive drum 4 which are to be printed, are not irradiated with the laser beam and the remaining area on the drum 4 is irradiated with the laser beam. This modulation may be made by controlling the generation of the laser beam in an ON-OFF fashion, or by selectively intercepting or deflecting the laser beam emitted from the laser 1. The modulated laser beam is directed by a scanner 3 to the photosensitive drum 4, so that the drum 4 is line-scanned by the laser beam. An overlay film 5 (that is, a film for performing an overlay operation) is moved by a film driving unit 6 in synchronism with the rotation of the photosensitive drum 4. The laser beam having been modulated on the basis of print information is incident on the photosensitive drum 4 through the film 5.

Figure 1:
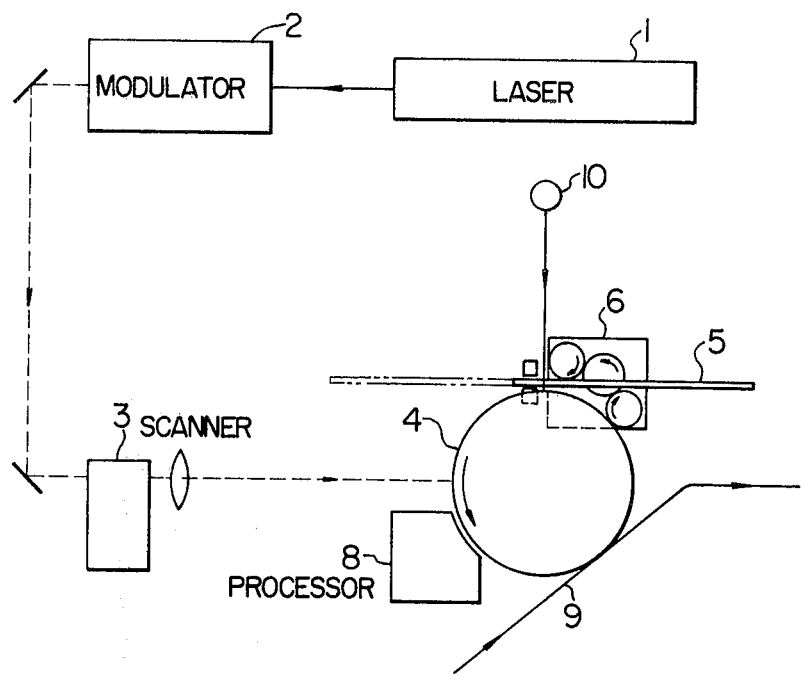
FIG. 1 is a schematic diagram showing an arrangement of a conventional laser beam printer.
Figure 3:
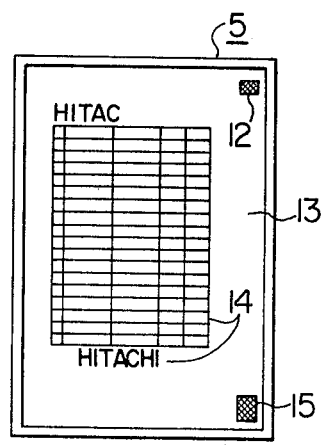
FIG. 3 is a diagram showing an example of a film used in the present invention.

FIG. 3 shows an example of the overlay film 5. Referring to FIG. 3, a fixed form of information 14, for example, ruled lines and predetermined characters are recorded on a transparent film 13 in block. Further, a front mark 12 and a rear mark 15 are also recorded in black. The laser beam passes through transparent portions of the film 5, however, black portions of the film 5 prevent the photosensitive drum 4 from being exposed to the laser beam. The marks 12 and 15 are provided at positions apart from an area where the printing is expected, and used to indicate the beginning and the end of a format, respectively.

Figure 4:
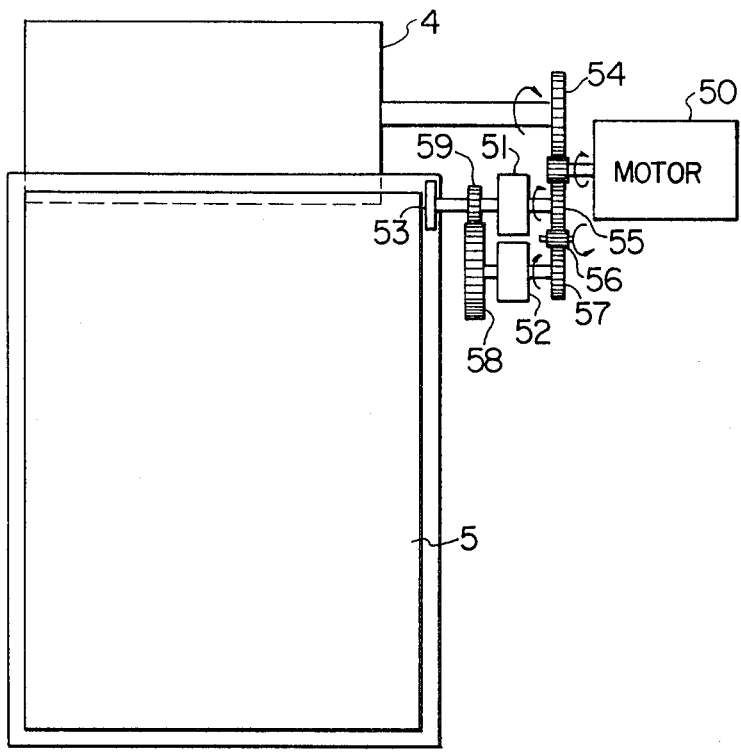
FIG. 4 is a detailed diagram of the film driving part shown in FIG. 2.

FIG. 4 shows the film driving unit 6 in detail. Referring to FIG. 4, a motor 50 is used to drive both the photosensitive drum 4 and film 5. In more detail, the motor 50 rotates the photosensitive drum 4 through a gear 54. On the other hand, the motor 50 drives two driving mechanisms, that is, a first mechanism for driving a film driving roller 53 through a gear 55 and a forward clutch 51, and a second mechanism for driving the roller 53 through gears 55, 56 and 57, a backward clutch 52, and gears 58 and 59. The clutches 51 and 52 have a function of transmitting a rotational motion from the right to the left in FIG. 4. When the forward clutch 51 is connected to the roller 53 and the backward clutch 52 is disengaged, the first mechanism is driven and the roller 53 is rotated in the same direction as the photosensitive drum 4. On the other hand, when the forward clutch 51 is disengaged and the backward clutch 52 is connected to the roller 53, the second mechanism is driven and the roller 53 is rotated in the direction opposite to the above-mentioned direction.

Figure 6:
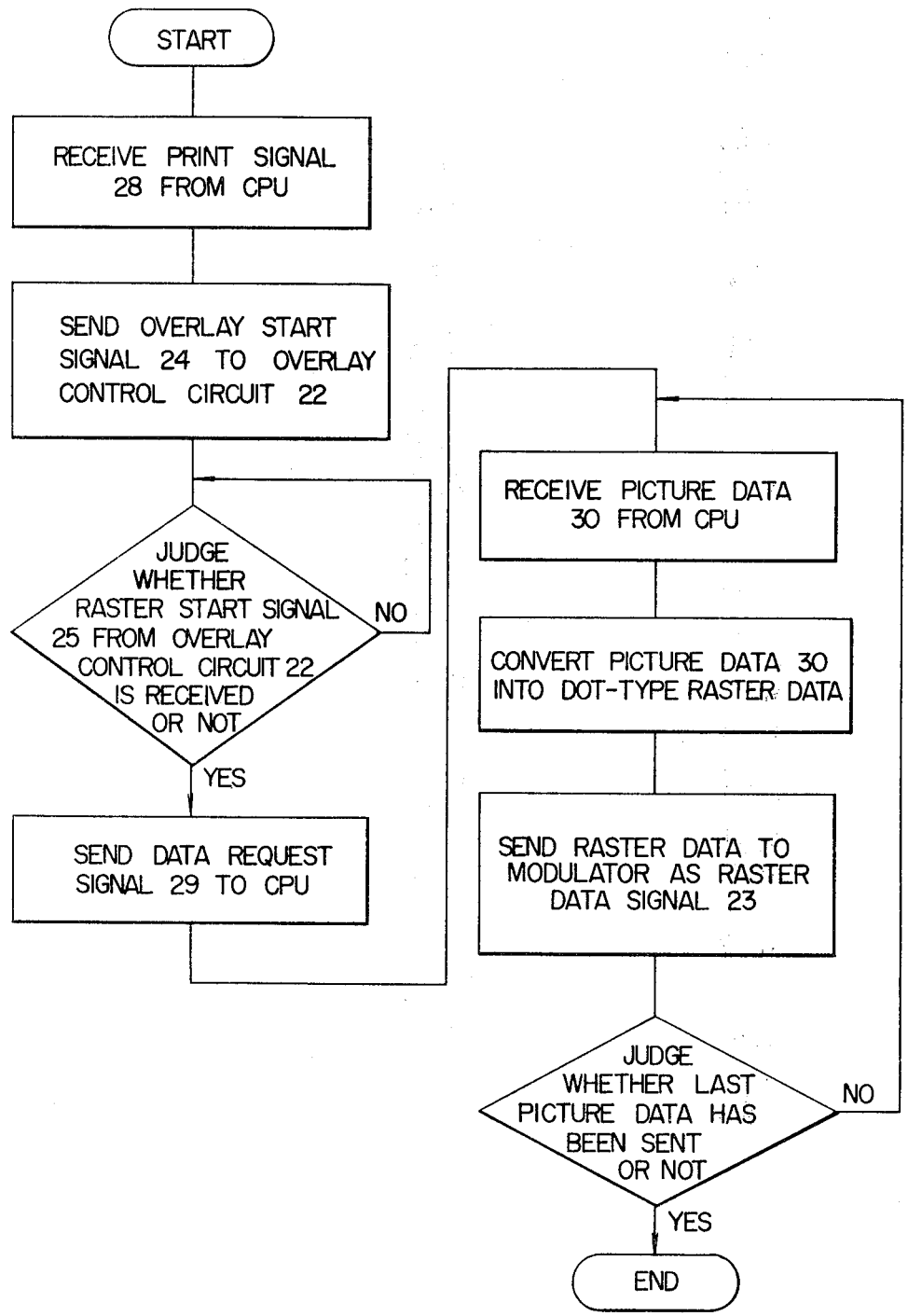
FIG. 6 is a flow chart for explaining the operation of the printer control circuit shown in FIG. 2.

Referring to FIG. 2, a central processing unit (CPU) 31 edits variable print information, and a printer control circuit 21 controls the operation of the printer by executing a program. The control made by the printer control circuit 21 will be explained below with reference to a flow chart shown in FIG. 6.

Figure 5:
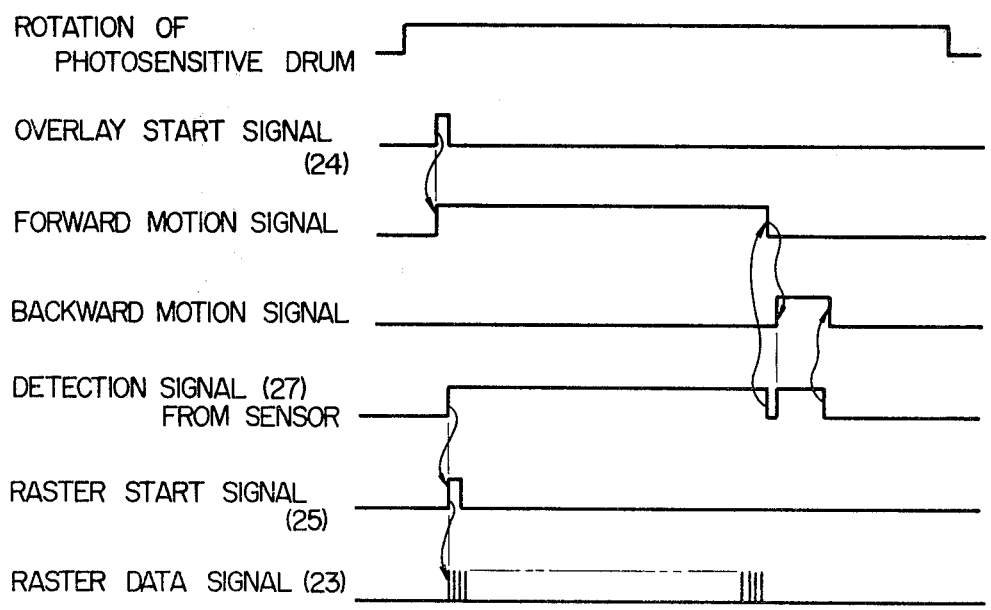
FIG. 5 is a time chart for explaining an overlay operation.

When the print information is ready to be sent to the printer, CPU 31 sends a print signal 28 to the printer. When supplied with the print signal 28 from CPU 31, the printer control circuit 21 rotates the photosensitive drum 4 and sends an overlay start signal 24 to an overlay control circuit 22. Time relation between these operations is shown in FIG. 5. When supplied with the signal 24, the overlay control circuit 22 delivers a signal 26 to cause the film 5 to move forward. When the film 5 has been moved till the forward mark 12 reaches a sensor 7, a detection signal 27 is generated. When applied with the detection signal 27, the overlay control circuit 22 sends to the printer control circuit 21 a raster start signal 25 for starting the scanning operation of the laser beam. When supplied with the raster start signal 25, the printer control circuit 21 sends a data request signal 29 to CPU 31. Data 30 from CPU 31 is converted by the printer control circuit 21 into serial data 23 having a series of bits (namely, raster data), which is usable in the modulator 2, and the raster data 23 is sent to the modulator 2. The film 5 and the surface of the photosensitive drum 4 are made equal in moving speed to each other.

The modulated laser beam is incident through the film 5 on the photosensitive drum 4 in the above-mentioned manner, and thus printed matter is obtained in which characters and numerals are superposed on such a format as shown in FIG. 3. The laser beam is incident upon portions of the film other than portions corresponding to the characters and numerals. However, the incident laser beam is intercepted by black portions of the film which make the format, and therefore areas on the photosensitive drum 4 corresponding to the black portions of the film 5 are not exposed to the laser beam. Since the laser beam is cut off at times corresponding to the characters and numerals, areas on the photosensitive drum 4 corresponding to the characters and numerals are not exposed to the laser beam, independently of whether these areas correspond to the black portions of the film or not. Accordingly, a latent image is formed on the photosensitive drum 4 in a manner that information for modulating the laser beam is superposed upon information on the film 5. After the last data has been sent to the modulator 2, the rear mark 15 on the film 5 is detected by the sensor 7, and the detection signal 27 is thereby delivered. When supplied with the detection signal 27, the overlay control circuit 22 connects the backward clutch 52 shown in FIG. 4 to the roller 53 in order to cause the film 5 to move backward. The speed of backward motion is made higher than that of forward motion. The backward motion of the film 5 is stopped when the front mark 12 is detected by the sensor 7. Accordingly, the film 5 is restored to the initial state, and put in a waiting state. The rotation of the photosensitive drum 4 is stopped after the development and transference have been completed.

In the present embodiment, an operator replaces the film 5 when it is required to print different formats. However, an arrangement may be formed in which a plurality of films are provided and one of them is selected by depressing a button. Further, another arrangement may be employed in which one of the films is specified by a program.

Figure 7:
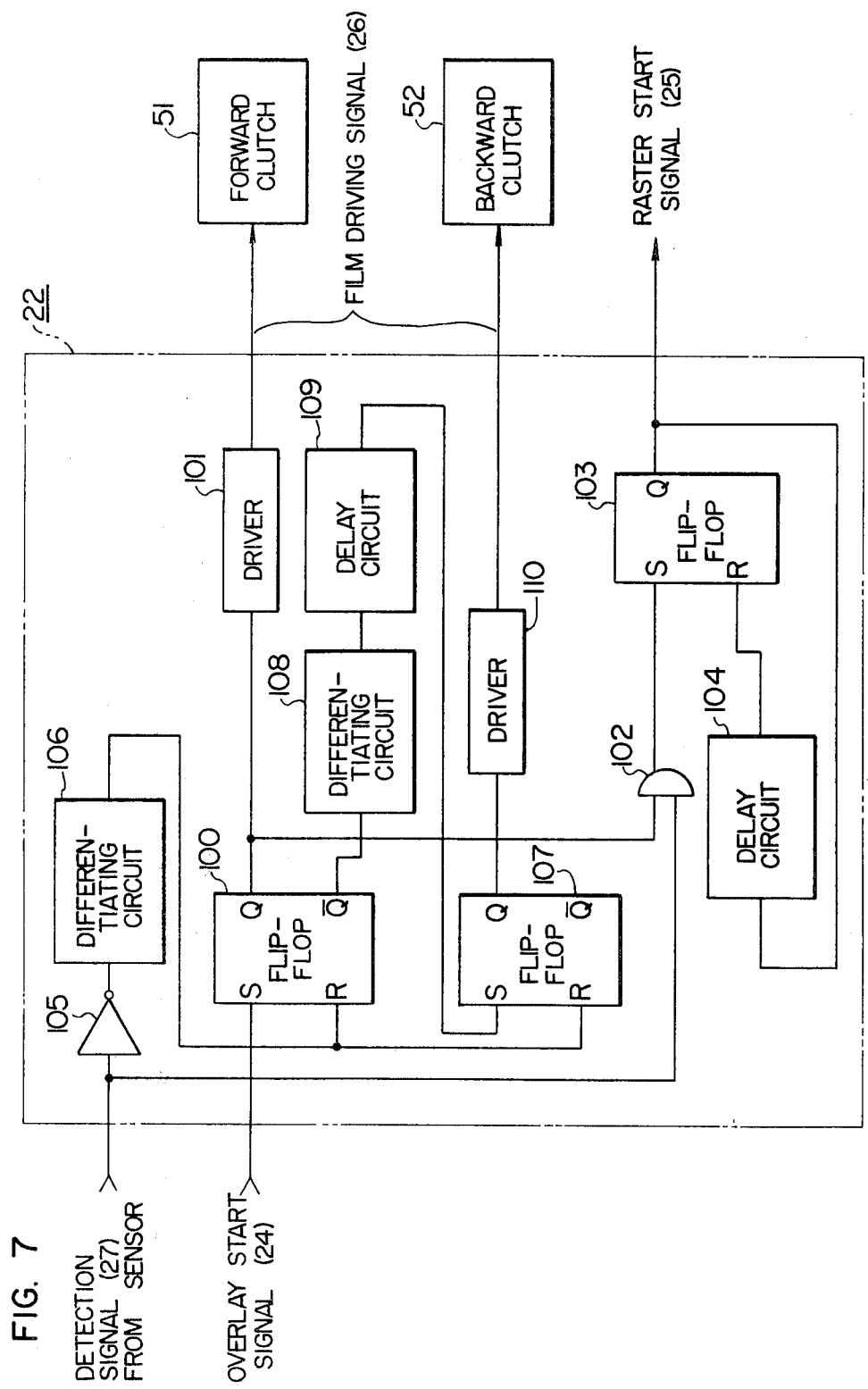
FIG. 7 is a detailed block diagram of the overlay control circuit shown in FIG. 2.

Next, the overlay control circuit 22 will be explained below in detail, with reference to FIG. 7. When applied with the overlay start signal 24, a flip-flop 100 is set and operates a driver 101 to connect the forward clutch 51 to the roller 53. An AND gate 102 is made open by the detection signal 27 from the sensor 7 and the output of the flip-flop 100, to set a flip-flop 103, which delivers the raster start signal 25. The flip-flop 103 is reset when a delay time set in a delay circuit 104 has elapsed. The detection signal 27 from the sensor 7 is given in such a form as shown in FIG. 5, (that is, the signal 27 takes a low level for the parts of the film 5 having the marks 12 and 15 and takes a high level for the transparent part of the film 5). The signal 27 is inverted by an inverter 105, differentiated by an differentiating circuit 106, and then applied to respective reset terminals of flip-flops 100 and 107 to reset both of the flip-flops 100 and 107. When the flip-flops 100 and 107 are reset, the forward clutch 51 is disengaged and the $\overline{Q}$ output of the flip-flop 100 is supplied to the set terminal of the flip-flop 107 through a differentiating circuit 108 and a delay circuit 109 to set the flip-flop 107. When the flip-flop 107 is set, a driver 110 is operated and connects the backward clutch 52 to the roller 53. When the film 5 is moved backward to the state that the front mark 12 is again detected and thereby the detection signal 27 takes the low level, the output of the differentiating circuit 106 resets the flip-flop 107 and thereby the backward clutch 52 is disengaged.

As mentioned above, according to the present invention, an overlay operation can be performed on the basis of a film in which a format is printed off, without employing an additional light source.

We claim:

1. A laser beam printer for forming a latent image on a photosensitive body by a laser beam modulated in accordance with print information, comprising:
- means for generating a laser beam modulated in accordance with print information;
- a photosensitive body irradiated with said laser beam for forming a latent image on a surface of said photosensitive body;
- scanning means for line-scanning said photosensitive body by said laser beam; and
- a film having format information recorded thereon, said film being arranged between said scanning means and said photosensitive body whereby said print information is superposed on said format information.

2. A laser beam printer according to claim 1, wherein said laser beam is modulated not to reach areas on said photosensitive body to be printed, but to reach the remaining area on said photosensitive body, and said film being provided with a positive image of a format which prevents said photosensitive body from being exposed to said laser beam.

3. A laser beam printer according to claim 1 or 2, wherein said photosensitive body has the form of a drum, and wherein said photosensitive body and said film are rotated and moved, respectively, in a condition that the photosensitive surface of said photosensitive body and said film are equal in moving speed to each other.

* * * * *